Jan. 17, 1956 W. S. COBEN 2,731,062
TUBELESS TIRE
Filed Dec. 2, 1953
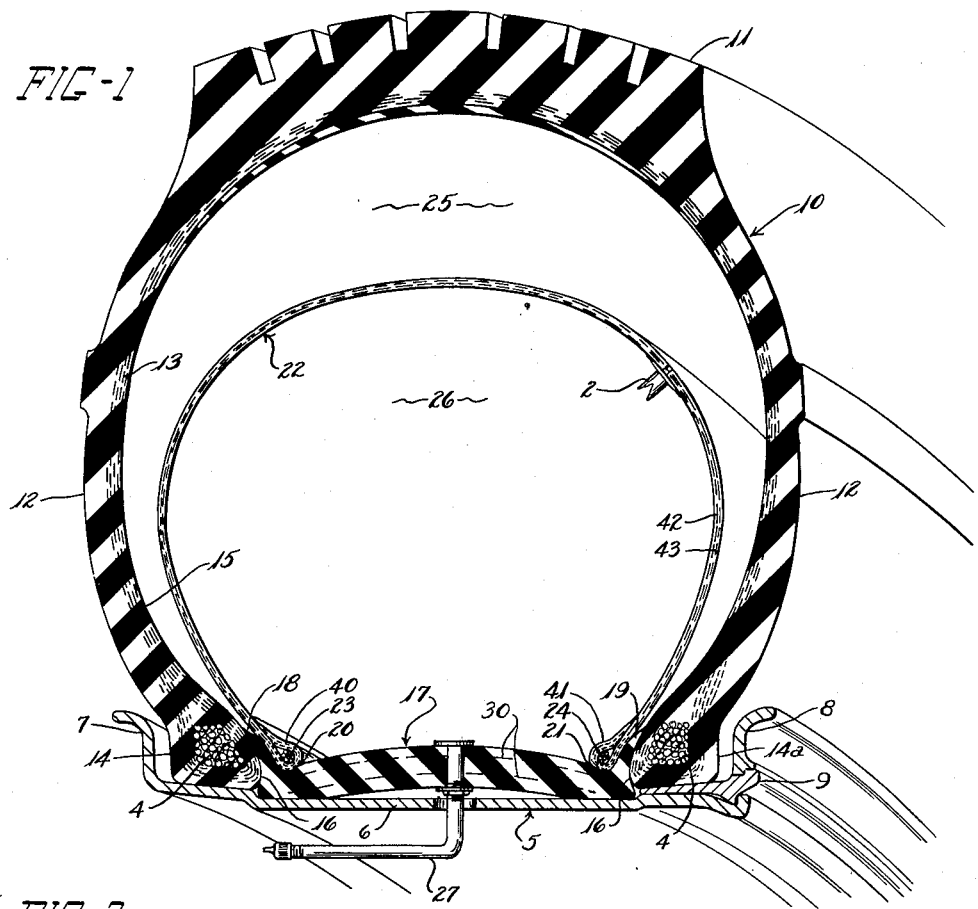
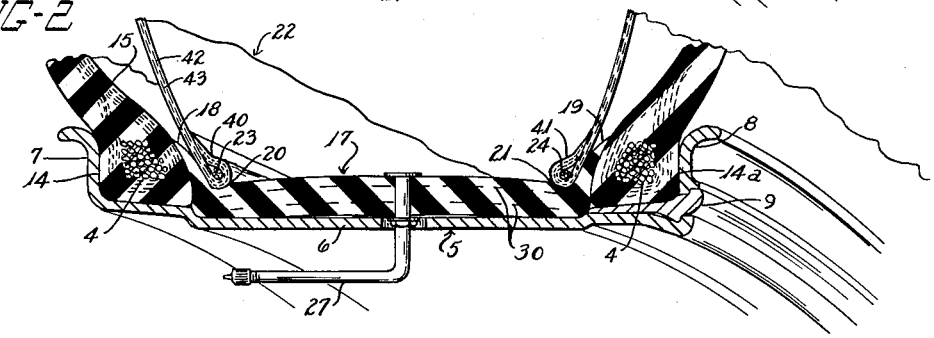
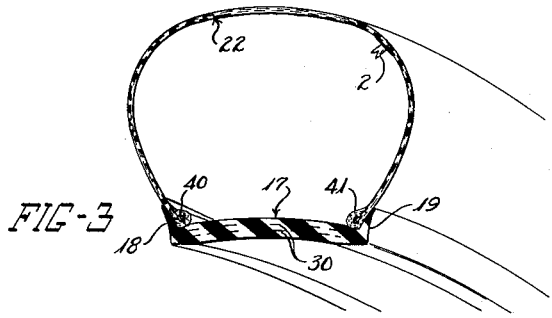
INVENTOR.
WILLIAM S. COBEN
BY
W. A. Fraser
ATTY.

United States Patent Office 2,731,062
Patented Jan. 17, 1956

2,731,062
TUBELESS TIRE

William S. Coben, Akron, Ohio, assignor to The Firestone Tire & Rubber Company, Akron, Ohio, a corporation of Ohio Application December 2, 1953, Serial No. 395,825

2 Claims. (Cl. 152—341)

This invention relates to tubeless tires, of the type having auxiliary load carrying means, in the form of an inner wall that defines a portion, of an inflatable inner chamber; said inner wall being adapted to support the tire load, in the event of a tire blowout, whereby the driver of an automobile, on which such tires are being used, will be able to retain control of the automobile until it can be brought to a stop.

It is an object of the present invention to provide such auxiliary load carrying safety element that is an improvement over those heretofore known in the industry.

Another object of the invention is to provide a safety element combined with sealing means disposed between the beads of a tire in such manner and of such shape as to prevent the passage of air between said sealing means and the beads of the tire.

A further object of the invention is to provide sealing means for a tubeless tire which means is adapted to support a safety diaphragm and to lock the tire beads on the rim if and when the inflationary air of such tire has escaped.

These and other objects will be apparent in the following descriptions, reference being had to the drawings, in which:

Fig. 1 is a fragmentary perspective view partly in section of an assembly embodying the present invention comprising a tire, with a safety member including a sealing ring mounted therein and the tire mounted upon its rim showing the relative positions of the components of the combination thereof before the tire has been inflated;

Fig. 2 is a sectional view similar to Fig. 1, except the relative position of the components of the combination is shown as they will appear when the tire is inflated; and Fig. 3 is a fragmentary perspective view partly in section of said safety member and sealing member assembled preparatory to being mounted in a tire.

Referring to Fig. 1 of the drawing, there is shown a tire 10, comprising the usual tread portion 11, sidewalls 12, tire plies 13, bead portion 14, 14a and tire rim 5. The tire is of the straight side type in which the beads have the usual reinforcing wires 4, by which the tire is held on the rim. Tire 10 has an inside lining 15 which is impervious to air and preferably composed of butyl of approximately .010 thickness and extends to the toe 16 of the tire bead.

A sealing member 17 is disposed between the tire beads 14, 14a, said sealing member being substantially in the form of a heavy endless band molded so that it is concavo-convex in cross-section at its middle portion with its middle radial outer surface convex, its radial inner surface, adjacent its lateral edges, flat; said flat surface being adapted to normally contact said tire rim (see Fig. 1), and said sealing members lateral side or edge portions being molded to a shape substantially complementary to the lateral inside surface of the tire beads against which said sides are adapted to press and seal. Sealing member 17 terminates at its lateral side or edge portions in radially outwardly extending flanges 18 and 19 forming grooves 20 and 21 adapted to receive and anchor the edges or bead portions 40—41 of a safety element or diaphragm 22.

The safety element 22 is in the form of an open-beaded tire and preferably is composed of two thin plies of rubberized fabric 42—43, anchored at their edge portions to annular inextensible bead members 23 and 24 thereby providing said safety members with inextensible edges. Bead members 23 and 24 are not necessarily, but preferably, composed of wire. The inside diameter of the edges 40—41 of safety element 22 is no greater than the outside diameter of sealing member 17 at grooves 20—21. The inside diameter of sealing member 17 radially inwardly from grooves 20 and 21 is approximately the same as the inside diameter of tire beads 14—14a. Rim 5 comprises a base portion 6 with an integral side flange 7, a removable side flange 8 and a lock ring 9. This rim is of the flat base type and as disclosed hereinabove the smallest molded inside diameter of the sealing member 17 is substantially the same as the outside diameter of rim base 6.

Safety member 22 is provided with a check valve 2 which communicates with a hole through the wall of the safety member and functions in the same way as valve 17 of the H. K. Chandley Patent No. 2,514,183, issued July 4, 1950, to which reference is made for a detailed description of applicant's valve 2, the way it functions and its purpose. As will now be understood, valve 2 permits free passage of air to the outer chamber 25 of tire 10 during inflation, but will be closed except for the small bleeder passage, when the air from the inner chamber 26 of said tire seeks to flow rapidly into the outer chamber through valve 2 as will happen when a tire blowout or large tire puncture occurs. Sealing member 17 is provided with a valve 27 of the type employed in truck tire inner tubes. As will be understood by those familiar with the art, valve 27 communicates directly with inner chamber 26.

In mounting the safety member and sealing member in tire 10 and then the tire on rim 5, applicant has found a convenient method is to first assemble the safety member 22 and sealing member 17 as shown in Fig. 3 and then insert this assembly within tire 10 in the usual manner of mounting inner tubes in tires. Next the tire with the assembled safety member and sealing member therein is mounted upon rim base 6 before the removable side flange 8 and lock ring 9 are in operative position. After the tire has been so placed upon the rim base, with one tire bead pressed firmly against flange 7, the removable flange 8 is mounted and locked in position by lock ring 9.

It is to be understood that the axial width of sealing member 17 is such that contact is made between its lateral sides or edges and the tire beads upon the mounting of side flange 8. It is also to be understood that it is desirable that the width of tire beads 14 and 14a be accurately controlled in tire molding so that little variation in total width of the tire beads and width of the safety member will occur. After mounting, as just explained, the tire of the assembly is inflated through valve 27 which is done in the usual manner of inflating tires with conventional inner tubes. As the inflationary air enters chamber 26 it flows through valve 2 to outer chamber 25 the inflation being at such rate as not to cause check valve 2 to close. The air pressure during inflation in chambers 26 and 25 is substantially equal. As the internal pressure within the tire increases, the central concavo-convex portion of the safety member 17, which normally, by which is meant in its natural shape, is spaced from the rim base, is forced radially inwardly and its ends outwardly against the tire beads 14—14a. If sufficient internal pressure is created in the tire, said central portion of member 17 will seat against the rim base. Applicant has found it desirable, however, to so construct sealing member 17 that it will resist the normal inflationary pressure to such extent that there will still remain some clearance between the central portion of the sealing member and the rim base while the tire is being run in service. This is to provide a follow-up pressure of the sealing member edge portions against the tire beads. By this arrangement it will be seen that not only is there an air tight seal between the member 17 and the surface of the tire beads, but that the tire beads 14—14a are pressed by the sealing member forcibly against the side flanges 7 and 8 respectively which insures a seal between the laterally outer tire surface of the tire beads and the tire flanges.

In service in the event of a tire blowout the flutter valve 2 is closed, except for a slow predetermined leak, from the rush of air therethrough and the safety member 22 becomes an inflated closed auxiliary load carrying member which supports the load a sufficient distance above the rim flanges as to permit the driver of an automobile to maintain control thereof for a length of time sufficient for him to bring it safely to a stop. If desired, the flutter valve 2 may be made to completely close in which event the automobile can be driven a greater distance before a tire change is necessary.

An important feature of the present invention is the combined air seal and bead lock provided by member 17. In safety members of the character described, the stability of the tire is necessarily impaired somewhat in the event of a tire blowout which subjects the tire beads to severe forces tending to rock them over the side flanges, which, if it happened, would permit the tire to leave the rim and make control of the automobile almost impossible. To escape from rim 5, tire beads 14—14a would have to dislocate the sealing member 17 which is being firmly pressed against these tire beads by virtue of the internal air pressure in chamber 26 forcing the central portion of member 17 radially inwardly and consequently the sides thereof laterally outwardly against beads 14—14a which, applicant has found, holds the beads of a blown-out tire firmly on the rim tire bead seats. While an all rubber sealing member 17 will function as described, applicant prefers to embody in its construction a plurality of fabric plies 30 as will be seen by reference to the drawing. The plies 30 add to the rigidity of the sealing member and they may be used to whatever extent is found desirable.

It will now be seen that applicant has provided a safety element for tubeless tires in combination with sealing means that seals the tire inflationary air within the tire in such manner that said air is not in contact with the tire rim. It will also be seen that such sealing means makes possible the mounting of tubeless tires on any type flat base or semi-drop-center tire rim and accordingly the invention is particularly adapted for use with truck tire rims which generally are of the split type.

The detailed description of the particular embodiment of the invention illustrated and described herein is not to be construed as limiting the invention thereto. The invention includes all features of patentable novelty residing in the foregoing description and the accompanying drawing.

What is claimed is:

1. In combination, a tire rim, an inflated tubeless tire mounted on said rim and a sealing member; and a safety diaphragm; said rim having a base portion and side flanges; said tire having laterally spaced bead portions engaging said flanges; said sealing member being disposed on said base portion and being clamped between and having its lateral edges in air tight contact with said bead portions when the tire is inflated, said sealing member being in the form of a molded endless band composed of resilient material of such thickness as to forcibly resist bending radially outwardly and having its middle portion concavo-convex in cross-section and whose radially inner surfaces, adjacent its lateral edges, are cylindrical and supported by said rim base; the surface of said concave portion facing radially inwardly and being spaced from said base portion; said concavo-convex portion being continuously pressed radially inwardly by air pressure whereby the edge portions of the sealing member are forced laterally outwardly by the force of the air in said inflated tire; said diaphragm being in the form of an open-beaded tire having laterally spaced inextensible bead portions removably mounted on the radially outer surface of said sealing member.

2. In combination, a tire rim, an inflated tubeless tire mounted on said rim and a sealing member; and a safety diaphragm; said rim having a base portion and side flanges; said tire having laterally spaced bead portions engaging said flanges; said sealing member being disposed on said base portion and being clamped between and having its lateral edges in air tight contact with said bead portions when the tire is inflated, said sealing member being in the form of a molded endless band composed of resilient material of such thickness as to forcibly resist bending radially outwardly and having its middle portion concavo-convex in cross-section, the surface of said concave portion facing radially inwardly and being spaced from said base portion; said concavo-convex portion being continuously pressed radially inwardly by air pressure whereby the edge portions of the sealing member are forced laterally outwardly by the force of the air in said inflated tire; said diaphragm being in the form of an open-beaded tire having laterally spaced bead portions removably mounted on the radially outer surface of said sealing member.

References Cited in the file of this patent

UNITED STATES PATENTS

| | | |
|---|---|---|
| 2,113,031 | Merz, Jr., et al. | Apr. 5, 1938 |
| 2,419,075 | Herzegh | Apr. 15, 1947 |
| 2,554,815 | Church | May 29, 1951 |
| 2,674,291 | Campbell | Apr. 6, 1954 |
| 2,674,292 | Sutton | Apr. 6, 1954 |

FOREIGN PATENTS

| | | |
|---|---|---|
| 1,026,545 | France | Feb. 4, 1953 |